United States Patent [19]

Hastings et al.

[11] Patent Number: 4,634,944
[45] Date of Patent: Jan. 6, 1987

[54] CYCLIC SPEED MOTOR CONTROL CIRCUIT

[75] Inventors: John D. Hastings; Dennis K. Siemer, both of Mankato, Minn.

[73] Assignee: Johnson Fishing Inc., Mankato, Minn.

[21] Appl. No.: 729,808

[22] Filed: May 2, 1985

[51] Int. Cl.⁴ .............................................. H02P 7/00
[52] U.S. Cl. ..................................... 318/443; 318/434
[58] Field of Search ............... 318/443, 444, 138, 254, 318/439, 434; 114/255

[56] References Cited

U.S. PATENT DOCUMENTS

| | | | |
|---|---|---|---|
| 3,573,584 | 4/1971 | Kearns | 318/443 X |
| 3,728,603 | 4/1973 | Kearns | 318/443 |
| 3,942,083 | 3/1976 | Takahashi et al. | 318/254 A X |
| 4,132,930 | 1/1979 | Schalk | 318/254 X |
| 4,270,074 | 5/1981 | Duckworth et al. | 318/254 |

Primary Examiner—William M. Shoop, Jr.
Assistant Examiner—Bentsu Ro
Attorney, Agent, or Firm—Fitzpatrick, Cella, Harper & Scinto

[57] ABSTRACT

A motor control circuit comprising a switching circuit which controls the supply of power from a source thereof to a motor responsive to a control signal, and a speed control circuit which generates the control signal. The speed control circuit can vary the motor speed cyclically, operating as an stable multi-vibrator. An overload protection circuit detects the occurrence of a current overload condition and either reduces to a low level the power delivered to the motor or inhibits the switching circuit's operation altogether.

13 Claims, 1 Drawing Figure

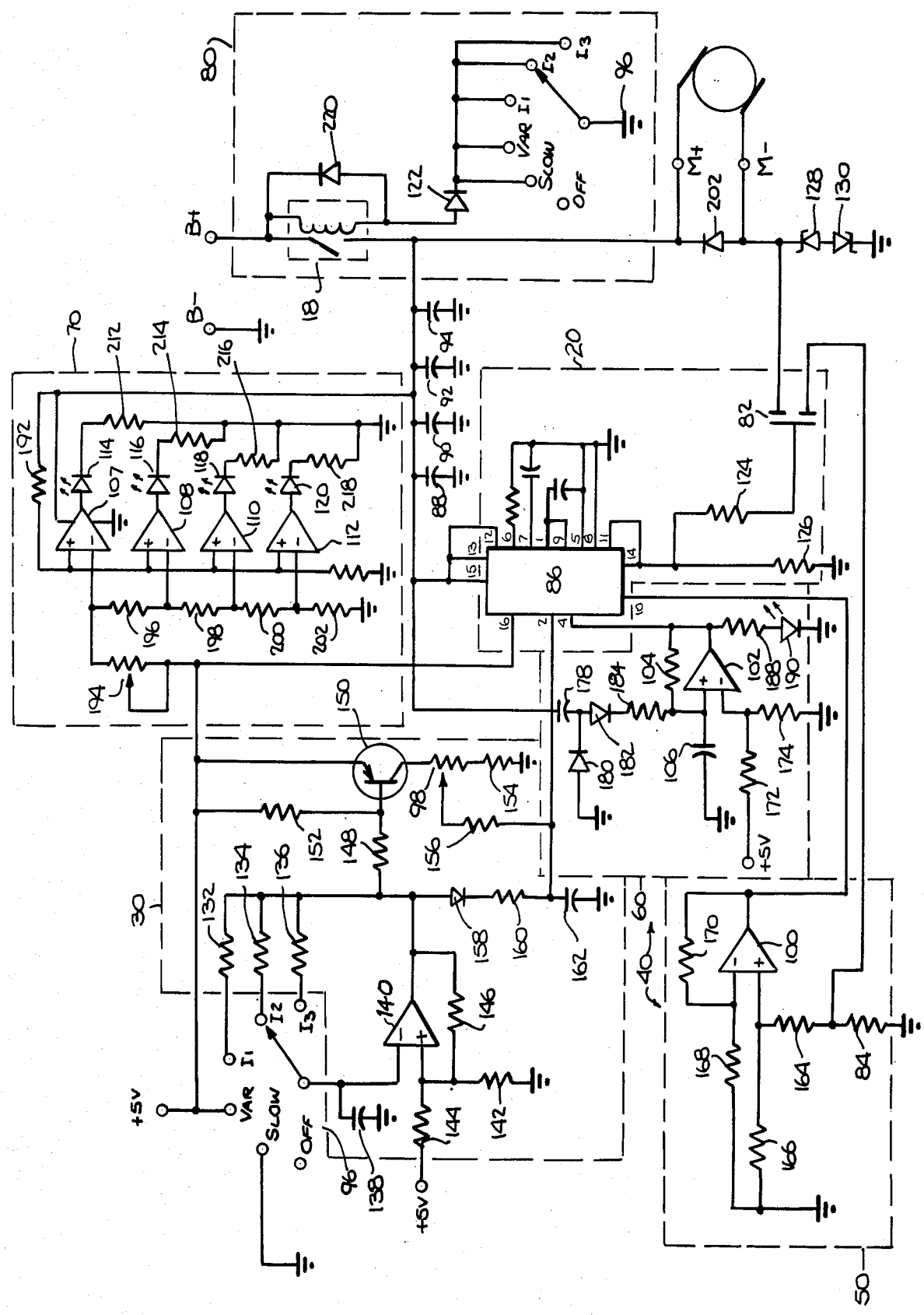

CYCLIC SPEED MOTOR CONTROL CIRCUIT

BACKGROUND OF THE INVENTION

The present invention pertains generally to circuits for controlling electric motors, and pertains more specifically to such a circuit that is able to drive a motor to produce automatically an intermittent movement.

While fishing, it is sometimes desirable to move a lure intermittently through the water to imitate the behavior of certain insects or the like on which fish feed, and thus to attract the fish to the lure. While such motion is commonly imparted to the line by movement of the fisherman's hand and arm, it would be convenient to be able to provide such motion automatically. One aspect of the present invention, accordingly, is to provide a means for doing so, by providing a motor control circuit suitable for use in controlling a trolling motor for a boat.

In fishing from a boat, it may occasionally happen that the propeller of the motor becomes blocked, and is prevented from turning. It would be desirable to provide a simple and yet effective means by which to ensure that, when such an accident occurs, neither the motor itself nor any of the control circuitry is damaged. Accordingly, another aspect of the present invention is the provision of such a means.

SUMMARY OF THE INVENTION

It is accordingly an object of the invention to provide a control circuit for an electric motor to produce automatically an intermittent movement of the device being driven by the motor.

Another object of the invention is to provide such a motor control circuit which is also capable of driving a motor smoothly, at a continuously variable speed, and which can be switched to a second mode of operation to produce intermittent movement.

Another object of the invention is to provide such a motor control circuit which, in its "intermittent" mode, alternates movement at a relatively high speed with movement at a much lower speed, the higher speed being continuously variable.

Still another object of the invention is to provide such a motor control circuit which has an overload protection circuit to reduce the current load in the event of an overload, and to disconnect the motor from the source of electrical power if a serious overload occurs, to prevent damage to either the motor or any portion of the motor control circuit.

Yet another object of the invention is to provide such a motor control circuit in which, if a serious overload occurs, an overload protection circuit disables the motor control circuit, requiring that the latter be turned off and then reactivated before power can again be supplied to the motor.

According to the present invention, these objects are achieved by means of a motor control circuit comprising a source of electric power, such as a battery, a switching circuit for alternatingly completing and interrupting an electrical path including the source and the motor, and a circuit for controlling the switching circuit. The control circuit generates a control signal and applies the signal to the switching circuit. By way of example only, the switching circuit may comprise an FET device operated by a pulse width modulator which generates pulses the widths of which are controlled by the voltage of the control signal. The control circuit comprises means for receiving commands to provide different control signals for operating the motor at different speeds.

The control circuit may be, for example, a speed control circuit, in which case the control signal is preferably one which causes the switching circuit to supply power to the motor to drive the latter at a relatively high speed, for a predetermined period, after which the speed control circuit then generates a second control signal and applies it to the switching circuit to drive the motor at a second, preferably very low speed. After a further predetermined length of time, the second control signal is discontinued and the first, high-speed control signal is again generated and applied to the switching circuit. By these means the driven element such as a small fishing boat is moved along in an intermittent manner.

The control circuit may, instead or additionally, be designed to protect the motor and the motor control circuit from excessive current. In this case, the control circuit comprises means for detecting an excessive current in the motor, and for inhibiting the switching circuit from supplying power to the motor, preferably at least until the excessive current decreases.

These and other objects and features of the invention will be more thoroughly and completely understood from a consideration of the following detailed description of the preferred embodiment thereof, taken in conjunction with the accompanying drawing.

BRIEF DESCRIPTION OF THE FIGURE

The sole FIGURE is a schematic circuit diagram of the preferred embodiment of the invention.

DETAILED DESCRIPTION OF THE PREFERRED EMBODIMENT

The FIGURE shows the preferred embodiment of the invention, which comprises a source of DC voltage such as a battery (represented by terminals B+ and B−), connected by a relay 18 and terminals M+ and M− to a motor, a switching circuit 20 which controls the supply of power from the battery to the motor responsive to a control signal, and a speed control circuit 30 which generates the control signal. A current overload protection circuit 40, which itself comprises a motor-lock protection circuit 50 and a ripple current protection circuit 60, is also provided, as are a circuit 70 to indicate to the motor operator the condition of the battery and a circuit 80 to protect the motor control circuit from damage due to an accidental connection of the battery with the incorrect polarity.

Initially, a general description of the motor control circuit will be given, followed by more detailed description of the component circuits thereof.

The switching circuit 20 produces a train of pulses at uniform intervals, e.g., at a frequency of 25 KHz. Each pulse closes a switch (FET 82 in the embodiment shown) to allow current to pass from the positive terminal B+ of the battery through the motor, through FET 82, and through a current-sensing resistor 84 whose exact function is explained below, to ground. While the number of pulses per second is constant, the pulse width is varied by a regulated pulse width modulator 86 under the control of a control signal which is generated by the speed control circuit 30 and coupled as an input to the pulse width modulator 86. Ripple capacitors 88–94 filter out the high-frequency components of the battery output current which are due to the rapid switching on and off of FET 82.

The speed control circuit 30 generates the control signal which controls the width of the pulses provided by the pulse width modulator 86.

The operator of the motor controls the motor speed and selects from among several modes of motor operation by means of switch 96 and potentiometer 98. When switch 96 is in the "OFF" position, the motor control circuit of the invention is off, and no power is supplied to the motor. With the switch 96 in the "SLOW" position, a constant low voltage is applied to the input terminal 2 of the pulse width modulator 86 by the speed control circuit 30, and results in a narrow pulse width and a constant, low motor speed. With the switch 96 in the position labeled "VAR" in the FIGURE, the speed control circuit 30 outputs to the switching circuit 20 a signal the value of which is a function of the position of the potentiometer 98. With potentiometer 98 at a particular setting, the control signal applied to the switching circuit 20 is constant, resulting in a constant pulse width and motor speed that varies from low to the maximum permitted by the motor control circuit. When the operator sets the switch 96 at any of the positions respectively labelled "I1", "I2" and "I3" in the FIGURE, the motor control circuit produces a motor speed which varies, in a cycle, between a relatively high speed and a very low speed, equal to that obtained with the switch 96 set at "SLOW". In this "intermittent" mode, the higher speed can itself be varied continuously by adjusting potentiometer 98. The relative durations of the high-speed and low-speed periods are determined by choosing among the three intermittent-motion settings I1, I2 and I3.

The current overload protection circuit 40 detects the existence of an excessive motor current, due to a condition such as a locked rotor, by monitoring the voltage drop across the resistor 84. When a current overload is detected, a comparator 100 applies a high voltage to the input 10 of the pulse width modulator 86, reducing the width of pulses generated by the latter to a minimum and thus reducing the effective current applied to the motor by the battery to a very low level. During such a current overload, however, the train of very narrow pulses output by the pulse width modulator 86 results in large ripple currents through the ripple capacitors 88–94, endangering the latter. To prevent the ripple capacitors from burning out due to the high ripple current, and to shut down the motor if the locked rotor persists, the ripple current protection circuit 60 which constitutes a portion of current overload protection circuit 40 rectifies the ripple current to a voltage signal which is applied to the input of a comparator 102. If the ripple current is high enough to endanger capacitors 88–94, the comparator 102 produces a high output and applies it to input 4 of the pulse width modulator 86, inhibiting the pulse width modulator from generating pulses. The output of the comparator 102 is fed back to its input via a resistor 104, latching the comparator output at its high level. Until the motor control circuit is turned off by means of switch 96, capacitor 106 connecting the input of the comparator 102 to ground cannot discharge, and the pulse width modulator 86 cannot generate pulses. In this fashion, a dangerously high ripple current resulting from a motor lock results in the disabling of the motor control circuit until the circuit is turned off for at least the time needed for the capacitor 106 to discharge.

Circuit 70 indicates to the user when the battery voltage decreases. The battery voltage is compared by each of four comparators 107–112 to a different reference voltage, and light-emitting diodes 114–120 each emit light if the battery voltage is greater than the reference voltage supplied to the corresponding one of the comparators 107–112. The number of lit LED's tells the operator approximately what the battery voltage is.

Circuit 80 closes relay 18 when the double-ganged switch 96 is set at any position other than "OFF", provided that the battery has been installed with the correct polarity. If the battery polarity is incorrect, diode 122 prevents any current from flowing, thus preventing possible damage to other circuit elements from improper back-biasing.

The Switching Circuit

The pulse width modulator 86 of the switching circuit 20 is preferably of the type commercially available under the designation LM3524. The specifications, pin assignments and other characteristics of that type of circuit are well known to those skilled in the art and will not be set forth herein. Again, the device 86 provides a constant frequency squarewave output, wherein the width of each pulse is controlled in proportion to the amplitude of an input signal at pin 2 thereof. The FET 82, which can be a high-power FET or, preferably, may comprise several lower-power FET's connected in parallel to reduce cost and power consumption, has its gate connected via resistor 124 to pins 11 and 14 of the pulse width modulator 86, which applies the pulses it generates to the FET gate to turn FET 82 on and off alternatingly. Resistor 126 connects pins 11 and 14 to ground. The source of FET 82 is connected to motor terminal M− and via Zener diodes 128 and 130 to ground, while the drain is connected to ground via current-sensing resistor 84.

Ripple-filter capacitors 88–94 are connected in parallel between motor terminal M+ and ground, and also have their higher-voltage terminals connected to pins 12, 13 and 15 of the pulse width modulator and to the input of the electronic circuit breaker circuit 60. Pin 16 of the pulse width modulator 86 provides a +5 volt supply, while pins 2, 4 and 10 are respectively connected to the output of speed control circuit 30, the output of the ripple current protection circuit 60 and the output of the overload protection circuit 50. The connections of the remaining pins of the pulse width modulator are readily comprehended by those skilled in the art and will not be detailed herein.

The Speed Control Circuit

The switch 96 has a movable arm or the like the free end of which is movable, as already noted, among the six positions "OFF", "SLOW", "VAR", "I1", "I2" and "I3". The "OFF" terminal is electrically isolated, so that the motor control circuit is turned off when switch 96 is set at that terminal. The "SLOW" terminal is grounded, the "VAR" terminal is connected to the +5 volt power supply, and the "I1", "I2" and "I3" terminals, correspond to three timing patterns for intermittent motion and are each connected to one end of respective resistors 132, 134 and 136. The arm of switch 96 is connected to ground via capacitor 138 and to the "−" input of comparator 140. The "+" input of the comparator is connected to ground via resistor 142, to the +5 volt power supply via resistor 144 and via a resistor 146 to the comparator output and to the second end of the three resistors 132, 134 and 136. The comparator output is also connected via a resistor 148 to the base of a PNP transistor 150. The transistor emitter is connected to the +5 volt supply, which also biases the base via a resistor 152. The collector is connected to ground via potentiometer 98 and resistor 154. The slide arm of the potentiometer is connected via resistor 156 to the input of the switching circuit 20 (pin 2 of the pulse width modulator 86). The output of comparator 140 is also connected via diode 158 and resistor 160 to pin 2. The lower-voltage end of resistor 160 is also connected to ground by capacitor 162.

When switch 96 is set at "OFF", the motor control circuit is off and no power is drawn from the battery. When switch 96 is set at "SLOW", the inverting input of comparator 140 is grounded, and the comparator output is applied via diode 158 and resistor 160 to the pulse width modulator 86. The voltage applied to the pulse width modulator at this switch setting is relatively low, so that the resulting pulses are narrow and the motor speed is low. When switch 96 is set at "VAR", the inverting input is high at +5 V, while the non-inverting input has a voltage lower than +5 V due to the voltage divider comprising resistors 144 and 142, so that the output of comparator 140 is low. As a result, the base of transistor 150 is at a lower voltage than is the emitter, turning the transistor on and resulting in a current through the transistor, the potentiometer 98 and resistor 156 to the pulse width modulator 86. The voltage applied to the pulse width modulator 86 with this switch setting is determined by the setting of the slide arm of potentiometer 98, and can vary from, e.g., that applied when switch 96 is at "SLOW" to that corresponding to maximum motor speed.

When the switch 96 is set to any of the positions "I1", "I2" or "I3", however, the motor is driven in the mode referred to herein as intermittent, alternating between a relatively high speed determined by the setting of potentiometer 98, and a low speed equal to that obtained at the "SLOW" setting. The selected resistor 132, 134 or 136 cooperates with capacitor 138 to form an RC timer circuit. Current charges the capacitor 138, until the resulting high voltage at the inverting input of comparator 140 lowers the comparator output, in turn timing the transistor 150 on. The speed control circuit output voltage now rises to a higher value determined by the setting of the potentiometer slide. The motor speed rises accordingly, and remains high until capacitor 138 has discharged and the comparator output rises again to the high level, and the cycle is repeated.

It will be apparent from the foregoing that the speed control circuit 30 operates in this mode as an a stable multivibrator. The durations of the two different output voltages, or control signals, output to the switching circuit 20 are determined by the time constant of the RC circuit comprising capacitor 138 and the selected resistor 132, 134 or 136.

The Current Overload Protection Circuit

Motor lock protection circuit 50 comprises comparator 100, which has its non-inverting input connected via resistor 164 and current-sensing resistor 84 to ground, and also connected to ground via resistor 166. The inverting input of comparator 100 is connected to ground via resistor 168 and via resistor 170 to the comparator output, which is supplied to pin 10 of the pulse width modulator 86.

Ripple current protection circuit 60 comprises comparator 102, the "−" input of which is connected via resistor 172 to the +5 volt power supply and via resistor 174 to ground. The "+" input is connected via the capacitor 106 to ground, and receives ripple currents from the ripple capacitors 88–94 via a capacitor 178, rectifying diodes 180 and 182 and resistor 184. Resistor 104 connects the non-inverting input to the comparator output and to pin 4 of the pulse width modulator 86. The comparator output is also connected to ground via resistor 188 and light-emitting diode 190 which indicates that the motor has been shut off.

In operation, when the motor overloads or locks, causing excessive current therein, the increasing motor current through resistor 84 raises the voltage at the non-inverting input of comparator 100, which accordingly applies a high output signal to the pulse width modulator 86 to reduce the width of the pulses generated thereby to a very small value, reducing the duty cycle of the motor and hence the motor current. The high ripple currents that result from the overload are rectified by diodes 180 and 182 and are then applied to the non-inverting input of comparator 102. If the ripple currents are dangerously large, a high output of comparator 102 results, and inhibits the pulse width modulator 86 from generating pulses. Resistor 104 latches the comparator output high, and LED 190 is activated to alert the user that the motor control circuit must be turned off to allow the capacitor 106 to discharge before the motor can be reactivated.

The Battery State Indicator Circuit

Circuit 70 comprises four comparators 107, 108, 110 and 112 connected in parallel. Each receives at its non-inverting input the output of battery terminal B+ via resistor 192 and filtered by capacitors 92 and 94. A potentiometer 194 and four resistors 196, 198, 200 and 202 form a voltage divider by means of which different reference voltages are supplied to the inverting inputs of the four comparators 107, 108, 110 and 112, the outputs of which thus each indicate whether the battery output voltage exceeds a respective reference voltage. The output of each of the comparators 107, 108, 110 and 112 is conveyed via a respective LED 114, 116, 118 and 120 and resistor 212, 214, 216 and 218 to ground. As the battery voltage gradually falls, the number of LED's which are lit also decreases, thus providing the operator with an approximate idea of the remaining battery power.

The Battery Polarity Protection Circuit

In circuit 80, the coil of relay 18 is connected in parallel with the spike suppressing diode 220 between battery terminal B+ and diode 122, which is connected to all of the terminals of the second half of double-ganged switch 96 except that labeled "OFF" in the FIGURE. If the battery is installed with the current polarity, then when switch 96 is set to any position other than "OFF", a current flows through the relay coil, closing the relay and supplying power to the motor. If the battery is improperly oriented, however, diode 122 prevents current flow, thus preventing damage to the other electronic components of the motor control circuitry.

The present invention has been described in detail with reference to the preferred embodiment; however, many modifications and variations thereof will now be apparent to those skilled in the art, and the scope of the present invention is therefore to be limited not by the details illustratively described herein, but only by the terms of the appended claims.

We claim:

1. A motor control circuit for controlling the supply of electrical power to a motor, said circuit comprising:
   a source of electrical power;
   switching circuit means for connecting said source and the motor to form a complete electrical path for the supply of power to the motor, said switching circuit means comprising means for controlling the speed of operation of the motor;
   a control circuit for generating a control signal coupled to said switching circuit means, wherein the speed of the motor is controlled by said switching circuit means in response to the value of said control signal, and wherein said control circuit automatically changes said control signal alternately and continuously between one value and another to operate the motor alternately at a first speed and at a second speed lower than said first speed, for thereby providing intermittent speed changes to the motor; and
   means for detecting the occurrence of a motor current overload and the occurrence of resultant ripple current, and means responsive to detection of said ripple current for inhibiting said switching circuit means from forming said complete electrical path.

2. The circuit of claim 1, further comprising a circuit means for visually indicating to a user the approximate voltage being output by said source.

3. The circuit of claim 2, wherein said visual indication circuit means comprises a plurality of light-emitting diodes and circuit means for illuminating a number of said diodes proportional to the approximate voltage of said source of power.

4. The circuit of claim 1, wherein said switching circuit means includes a FET device operated by a pulse width modulator.

5. The circuit of claim 1, wherein said speed control circuit means is also for generating a control signal for causing the motor to be driven at a substantially constant speed.

6. A motor control circuit for supplying power to a motor, said circuit comprising:
   a source of electrical power;
   switching circuit means for alternatingly completing and breaking an electrical circuit including said source and the motor to apply electrical power from said source to the motor, and to interrupt the supply of electrical power from said source to the motor, said switching circuit means controlling the application of power to the motor responsive to a first control signal; and
   speed control circuit means for generating the first control signal for controlling said switching circuit means, said speed control circuit means being operable in a first mode, in which said speed control circuit means generates the first control signal to have first and second time-dependent driving values for providing intermittent speed changes to the motor, thereby continuously driving said motor alternately at two different speeds.

7. The circuit of claim 6, wherein said speed control circuit means is also operable in a second mode, in which said speed control circuit means generates the first control signal to have a substantially constant value; and further comprising a switch for selecting between said first and second modes.

8. The circuit of claim 7, wherein said speed control circuit means further comprises an astable multi-vibrator for generating the first control signal in said first mode to have, in alternation, a first level and a second level.

9. The circuit of claim 8, wherein said astable multi-vibrator is adjustable to vary said second level continuously within a predetermined range.

10. The circuit of claim 8, wherein said astable multi-vibrator further comprises a switch and at least two RC circuits, each of said RC circuits corresponding to a different ratio of the durations of said two levels, and wherein said switch is coupled to select any one of said RC circuits.

11. The circuit of claim 7, further comprising a current overload protection circuit means for inhibiting said switching circuit means from applying electrical power to the motor, responsive to a motor overload.

12. The circuit of claim 11, wherein said protection circuit means is operable in response to rectification of a ripple current resulting from the overload.

13. A motor control circuit for controlling the supply of electrical power to a motor, said circuit comprising:
   a source of electrical power;
   switching circuit means for alternatingly connecting said source to the motor for completing an electrical path to supply electrical power from said source to the motor, and interrupting said electrical path to interrupt the supply of power to the motor;
   a speed control circuit for generating a control signal to control said switching circuit means to control the supply of power to the motor; and
   a current overload protection circuit comprising means for detecting when the motor is overloaded and for causing said switching circuit means, responsive to detection of the overload, to reduce the electric power being applied to the motor, said current overload protection circuit means comprising means for detecting and rectifying a ripple voltage and for inhibiting, responsive to said rectified ripple voltage exceeding a predetermined level, said switching circuit means from completing said electrical path.

* * * * *